United States Patent [19]

Geer

[11] Patent Number: 5,290,092

[45] Date of Patent: Mar. 1, 1994

[54] STOWAWAY ARMREST

[75] Inventor: Eliot H. Geer, Troy, Mich.

[73] Assignee: General Motors Corporation, Detroit, Mich.

[21] Appl. No.: 965,815

[22] Filed: Oct. 23, 1992

[51] Int. Cl.$^5$ .............................. B60N 2/46; A47C 7/54
[52] U.S. Cl. .................................. 297/411.32; 297/115; 297/194
[58] Field of Search ................. 297/115, 116, 416, 417

[56]  References Cited

U.S. PATENT DOCUMENTS

| | | | |
|---|---|---|---|
| 2,621,708 | 11/1949 | Luce, Jr. | 155/33 |
| 3,368,842 | 2/1968 | Polsky | 297/417 |
| 3,550,958 | 12/1970 | Krein | 297/417 |
| 3,612,606 | 10/1971 | Swenson | 297/417 |
| 3,857,605 | 12/1974 | Fantoni | 297/417 X |
| 4,216,994 | 8/1980 | Benoit | 297/417 X |
| 4,372,607 | 2/1983 | Mizushima et al. | 297/325 |
| 4,695,096 | 9/1987 | Kincaid | 297/417 |
| 5,104,191 | 4/1992 | Tame | 297/417 |

Primary Examiner—Peter Nerbun
Assistant Examiner—John J. Calvert
Attorney, Agent, or Firm—William A. Schuetz

[57] ABSTRACT

A stowaway armrest for a seat assembly for a vehicle which is pivotable about a single pivot on a seat back between a normal horizontal use position adjacent the side of the seat assembly and a horizontal stowed position behind the seat back. The single pivot has a pivot axis which is skewed with respect to a horizontal plane and vertical planes extending laterally and longitudinally through the vehicle so that the armrest is caused to rotate through a predetermined arcuate path when pivoted between its use and stowage positions and vice versa.

6 Claims, 3 Drawing Sheets

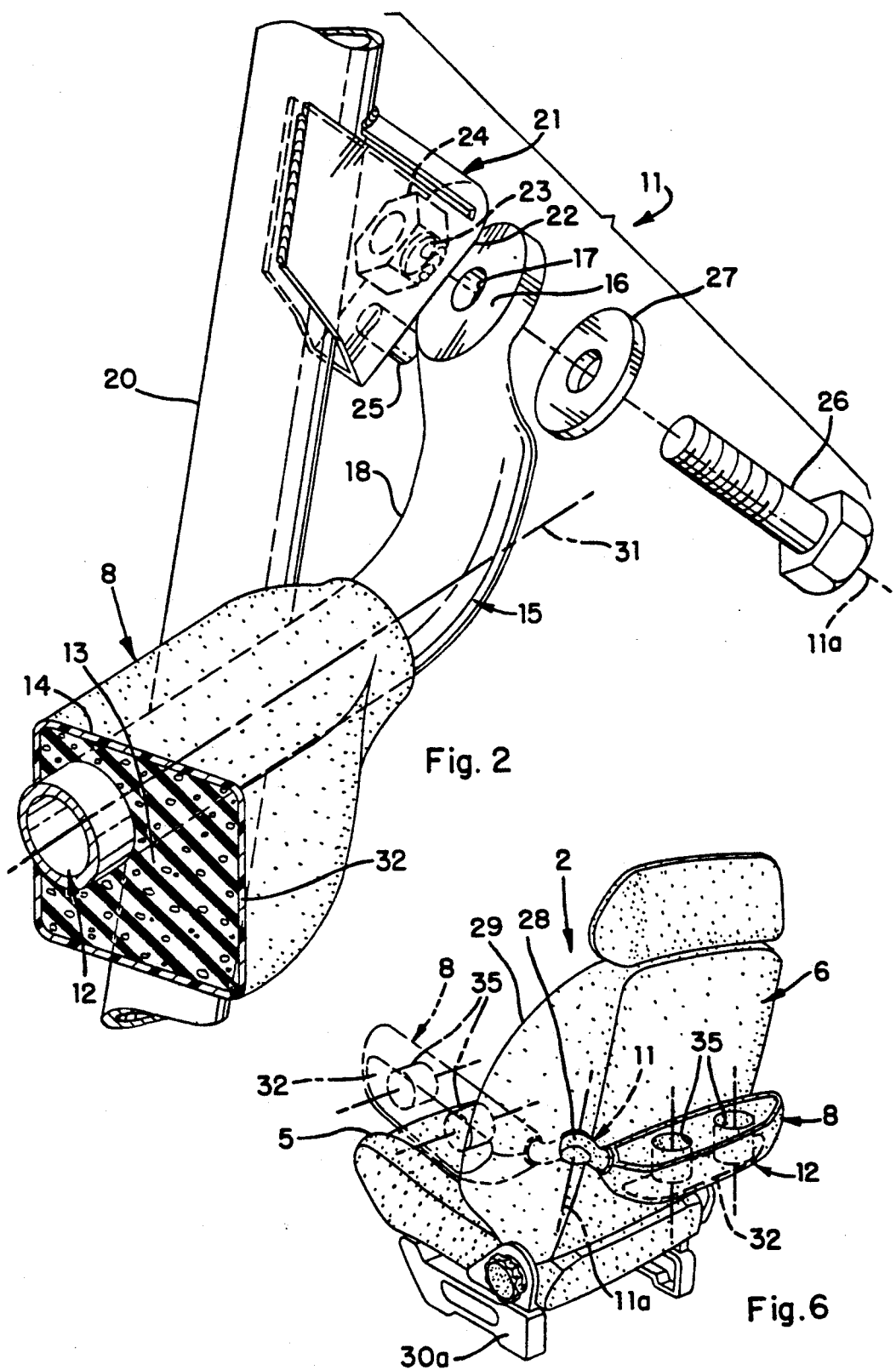

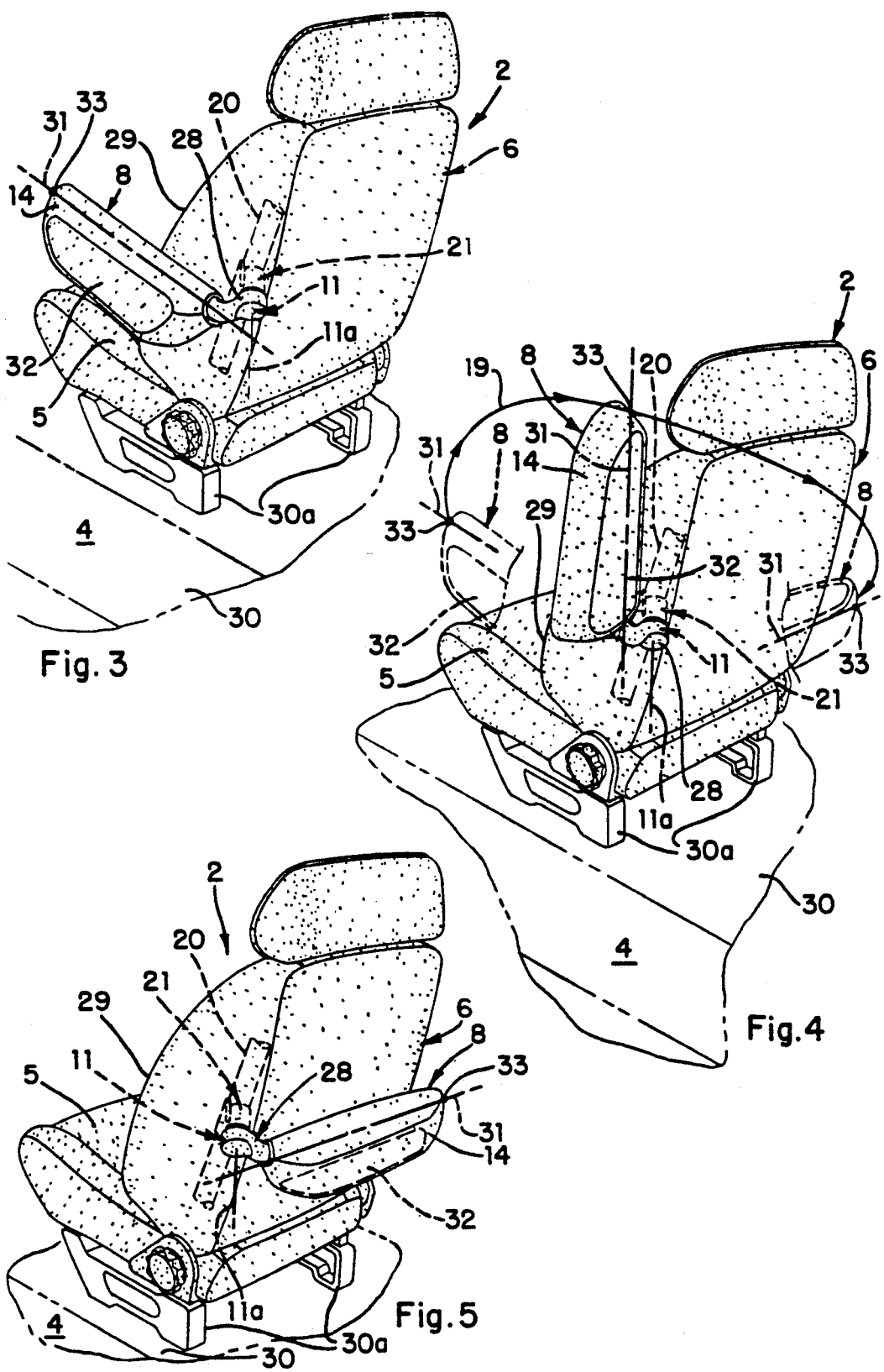

STOWAWAY ARMREST

BACKGROUND AND SUMMARY OF THE INVENTION

The present invention generally pertains to an armrest for a seat assembly, and especially to a vehicle seat having an armrest that is adjustable to a remote stowage position.

It is well known that flexibility with regard to interior space is a favored vehicle characteristic. Of the recent vehicle types, the minivan class is probably the most adept at utilizing interior space and novel features to maximize vehicle flexibility. Whereas a typical passenger car has fixed seating arrangements, minivans offer adaptive seating and storage configurations designed to improve vehicle utility. However, despite their popularity and features, minivans still exhibit certain shortcomings that decrease user satisfaction.

One common problem found in minivans is the inability to easily move around once inside the vehicle. Passengers who want to fully utilize the vehicle's flexibility often need to move between the front and rear seating positions. However, this act is not always easy or graceful because of narrow aisle widths caused by the trend toward smaller vehicles and wider seats. Additionally, armrests located at the side of the seats intrude into the aisle and further reduce the aisle width.

To facilitate movement, it is desirable to increase the effective aisle width. One way to do so is by allowing the seat armrests to be moved out of the way. It is known that armrests can be moved to facilitate seat ingress and egress. This is typically done with a horizontal Pivot that allows the armrest to be stowed in a vertical orientation adjacent to the seat backrest. Although acceptable for certain applications, when used in minivans, these types of armrests obstruct the aisle and inhibit movement of passengers between seating positions.

Other armrests have been proposed that have multi-axis Pivots to move the armrests to remote, non-intrusive stowage positions. However, these designs are elaborate and do not minimize intrusion by the armrest into the aisle. For example, the armrest shown in U.S. Pat. No. 3,550,958 can be stowed behind the seat backrest but, as shown in FIG. 2, actually intrudes further into an aisle when in its stowed position. U.S. Pat. No. 3,612,606 also presents an armrest that can be stowed behind the seat backrest but, as shown FIG. 4, provides only limited relief from intrusion because, even in its stowed position, the armrest that is still partially usable by a seated passenger. Lastly, U.S. Pat. No. 5,104,191 shows a thin armrest that is stored adjacent to the side of a seat backrest, but still intrudes into an aisle and, because of its necessary thinness, compromises comfort.

The above noted armrests all use complex mechanisms that do not fully minimize the affect of a stowed armrest on aisle clearance. In several of these armrests, large and unsightly pivot means are exposed to viewing by the passengers. Additionally, their operation is cumbersome because they usually require multiple motions through independent planes to reach their stowage positions.

In contrast to the above multi-axis pivot armrests, the present invention uses only a single pivot to move the armrest out of the aisle. The pivot means is small and unobtrusive and, therefore, able to be easily styled into the vehicle. The novel armrest has a pivot axis that is skewed to a horizontal plane and vertical planes extending laterally and longitudinally through the vehicle. This skewed pivot axis generates a single arcuate path for the armrest that does not lie solely in any one primary vehicle plane. Armrest motion begins up and away from the side of the seat cushion and ends in a downward facing direction toward the rear of the seat backrest. The invention is such that, when the armrest is stored behind the seat backrest, neither the armrest or pivot means intrude into the aisle.

In the preferred embodiment, the armrest unit itself is a conventional design having an elongate support structure, resilient padding for comfort, and an aesthetic first or outer surface. The support structure has a bend adjacent to its pivot end such that the armrest is properly oriented in its use and stowage positions and also so the armrest cooperates with the skewed pivot axis during rotation.

The present invention requires a predetermined path through the vehicle that must be clear of obstructions. Locations for other seats, "B" and "C" pillars, consoles, and the roof must also be considered when developing the path that the armrest will follow. For this reason, the armrest of the present invention is affixed to the side of the seat that is adjacent to an aisle, thereby providing the necessary clearances for motion. For example, in a front bucket seat application, the armrest is at the inboard side. However, if used on a rear bench seat, the armrest is positioned on the outboard side at the rear aisle. The remaining seat armrests, if any, can be conventional horizontal pivot types to allow for seat ingress and egress.

During continued vehicle operation, passengers will normally keep the armrest at their side for comfort. However, when a passenger wants to move to another seating position within the vehicle, he can do so by simultaneously lifting up and pushing the armrest away from its use position at the side of the seat. The armrest, with continued force applied as necessary to overcome gravity, will eventually settle into its stowage position against the rearward side of the seat backrest. With the aisle cleared of this obstruction, the passenger can exit his seat and move through the aisle. Similarly, when a passenger desires the comfort of a stowed armrest, he can reach around the backrest and move the armrest from its stowage position, through its arcuate path, and back to into its use position.

The preferred embodiment uses only stops and gravity to keep the armrest in its two positions. Therefore, the passenger need only lift the armrest as described above to effect motion thereof. If desired, however, a lock could be applied at the pivot such that the passenger had to release it before the armrest could be moved.

The skewed pivot means provides a novel armrest system that is advantageous to vehicle passengers. Accordingly, a primary object of the present invention is to facilitate movement through aisles by selectively moving armrests out of such aisles to maximize clearance space. Another object of the invention is to offer a stowable armrest that meets traditional comfort requirements. Still another object is to offer unobtrusive and simplified pivot means for stowing an armrest behind a seat backrest. These and other objects and advantages will be apparent from the detailed description of a preferred embodiment of the present invention when considered in conjunction with the accompanying drawings.

BRIEF DESCRIPTION OF THE DRAWINGS

In the accompanying drawings, wherein reference numbers are consistent throughout the several views:

FIG. 2 is an enlarged, exploded perspective view at the mounting of the present invention as viewed in the direction of arrow A shown in FIG. 1C; and FIGS. 3-5 are perspective views of a vehicle seat from the rear showing the present invention in the first use position, at a transitory position approximately midway through its arcuate path, and in the second stowage positions respectively;

FIG. 6 is similar to FIG. 5, but showing another embodiment of the present invention.

DETAILED DESCRIPTION OF A PREFERRED EMBODIMENT

Figure 1A:
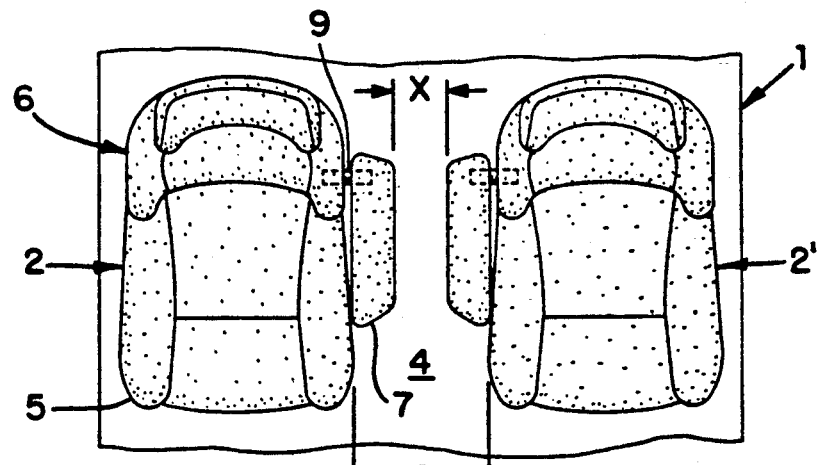
FIGS. 1A and 1B are top plan schematic representations of prior art rows of seats having arm rests.
Figure 1B:
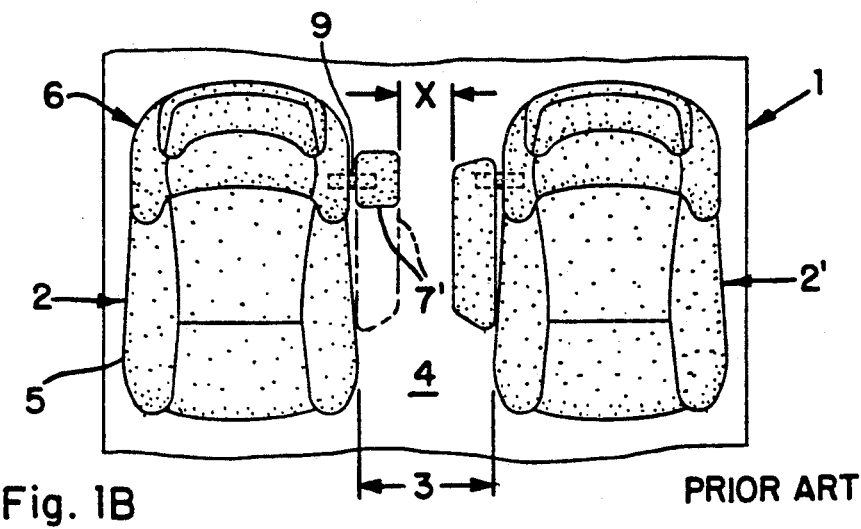
Figure 1C:
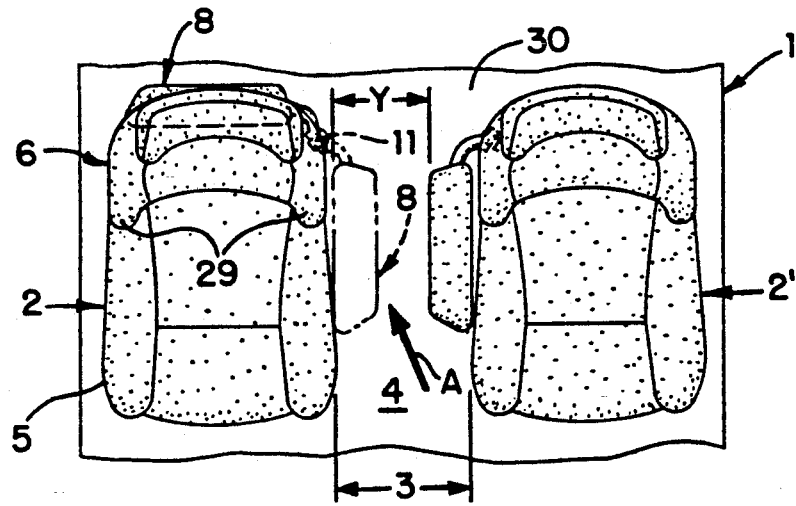
FIG. 1C is a schematic representation of a similar row of seats incorporating the novel stowaway arm rest of the present invention.

Referring to FIGS. 1A-1C, a vehicle 1 is shown with two seats 2, 2' configured so as to comprise a row. The seats 2 have a space 3 between them that is used as an aisle 4 when passengers want to move about inside the vehicle 1. The seat 2 can be of any suitable or conventional construction and comprises a lower cushion unit 5 and a backrest unit 6.

Although the seats 2, 2' shown are bucket seats and the aisle is between them, the present invention can also be used on other types of seats, including multiperson bench seats where the aisle is between the seat and the vehicle. The preferred embodiment only refers to an armrest mounted on the backrest of a bucket seat, but is equally applicable to other types of seats as well.

As shown in the FIG. 1A prior art arrangement, the seat 2 also comprises a stationary armrest unit 7 for comfortably supporting the passenger's arm while he or she is seated. The armrest 7 has a use position that is generally horizontal and adjacent to the seat cushion 5. When in this position, the armrest 7 intrudes into the space 3 between the adjacent seats 2, 2'. As a result, the effective width of the aisle 4 is limited to the short distance "IX", thereby inhibiting movement by passengers through the aisle 4.

In the FIG. 1B prior art arrangement, a traditional horizontal pivot 9 is used to mount an armrest 7' to the seat 2. The armrest 7' is pictured in its upright stowage position 10 which is adjacent to the backrest 6. This stowage position 10 is realized by rotating the armrest 7 from its use position, as shown by the phantom lines, approximately 90 degrees upward about the horizontal pivot 9. When the armrest 7' is stowed, the effective width of the aisle 4 is limited to the same short distance "X" as shown in FIG. 1A. It is easily Been that the aisle conditions have not improved by using a horizontal pivot 9 to stow the armrest 7'.

As can be seen in FIG. 1C, a wider aisle 4 results when using the same seat configuration in conjunction with a novel stowaway arm rest 8 of the present invention. The armrest 8 has a normal use position, as shown by the phantom lines in FIG. 1C. The armrest 8 has a stowage position 12 behind the backrest 6 and a novel skewed pivot 11 which results in an aisle 4 that has an increased width "Y". With the wider aisle 4, is is easier for passengers to move from the seat 2 to other locations within the vehicle 1.

The present invention is shown on only one seat 2 in FIG. 1C. However, it is possible to further increase the width of the aisle 4 if another seat 2' symmetrically used the arm rest 8 of the present invention as well. The resulting width would, advantageously, be limited only by the amount of space 3 between the adjacent seats 2, 2'.

In FIGS. 2 and 3 respectively, the armrest 8 is shown in its use position detailed with the skewed pivot 11. The armrest 8 itself comprises an elongate support 12 and a resilient pad 13 covered with an aesthetic cover or upholstery 14. The support 12 is tubular and has an exposed end 15 that extends beyond the pad 13 to the skewed pivot 11. The support 12 is flattened 16 at its exposed extremity 15 and provided with a bolt clearance hole 17 for securing the armrest to the back rest 6. There is a bend 18 in the exposed end 15 that allows the support 12 to cooperate with the orientation of the pivot 11 such that the armrest 8 is correctly oriented when at both its use position, as shown in FIG. 3, and at the stowage position 12, as shown in FIG. 5. The bend 18 also generates a predetermined arcuate path 19 for the arm rest 8 when rotated between its positions, as shown in FIG. 4. The path 19 must be developed so the armrest 7 will not contact obstacles in the vehicle 1 during rotational motion.

For clarity, the only backrest components depicted in FIG. 2 are the frame 20 and the pivot bracket 21. The backrest frame 20 is tubular and, although not shown in its entirety, has the overall shape of an inverted "U". The side of the frame 20 adjacent the aisle 4 has a generally U-shaped pivot bracket 21 welded onto it. As best shown in FIG. 2, the bracket 21 at its bight or bottom 22 is flat and lies in a plane perpendicular to the desired skewed pivot axis 11. The bight has a through hole 23 which is in alignment with a nut 24 welded to the inside of the bight 22 of the bracket 21 for securing the armrest 8. Lastly, a pin stop 25 is provided on the bracket 21 such that the elongate support 12 rests down against the pin 25 when the armrest 7 is in the use position 8. The pin 25 can be a separate piece welded to the bracket as shown, or it can be a tab stamped out of the bight 22 of the bracket 21 during forming.

The mounting system of FIG. 2 provides a single pivot axis 11 that is skewed with respect to a horizontal plane and vertical planes extending laterally and longitudinally through the vehicle. The axis 11 extends generally diagonally of the vehicle between the floor and ceiling thereof. A pivot bolt 26, aligned with the skewed axis 11, and a friction reducing washer 27 secure the exposed end 15 of the armrest support 12 to the pivot bracket 21. The bolt 26 is threaded into the nut 22. The flat under surface of the bight 22 provides a smooth bearing surface for the flattened end 16 of the support 12. A small decorative cover 28 hides the skewed pivot mounting arrangement 11 from view.

The operation of the present invention can best be seen by referring to FIGS. 3-5, wherein a seat 2 is shown comprising the present invention in varying positions. The seat 2 has a cushion 5 that is horizontally oriented and an upright backrest 6 that extends from the rear of the cushion 5. The backrest 6 comprises a structural frame 20 and wings 29 disposed on each side of the backrest 6 that laterally support the passenger's back. The seat unit 2 is mounted to the vehicle 1 by supports 30.

The seat 2 also has an armrest 8 comprising an elongate support 12 that defines i longitudinal axis 31 for the armrest 8. The support 12 is cooperatively secured to the backrest frame 20 for rotation about the skewed pivot axis 11. The aesthetic upholstery 13 covering the armrest 7 is sewn so as to create a side panel 32 that, while of no significance to the novelty or operation of the present invention, provides a convenient reference to help illustrate the motion of the armrest 8.

In FIG. 3, the armrest 8 is shown in its use position such that it provides comfortable arm support for seated passengers. In the use position, the longitudinal axis 31 is laterally offset slightly from the side of the seat cushion unit 5, disposed above the cushion unit 5 and extends generally perpendicular to the seat backrest 6. The armrest orientation can be seen by noting that the side panel 32 rests in a vertical plane extending longitudinally through the vehicle 1.

Since a passenger normally enters and exits the vehicle 1 from the opposite side of the seat 2, the armrest 8 can remain in the use position indefinitely. The armrest 8 only needs to be moved from its use position when a passenger wants to gain access to the aisle 4 from the seat 2, or to the seat 2 from the aisle 4. When the armrest 8 is in its use position, rotation is initiated by applying a force so as to simultaneously lift and push the armrest 7 away from the seat cushion 5.

A continued force, as shown in FIG. 4 will rotate the armrest 8 about the skewed pivot 11. The rotation is such that an imaginary point 33 on the tip of the armrest 8 will trace the arcuate path 19 shown. The skewed axis of the pivot 11 and the bend 18 of the support 12 is such that the armrest 18 is initially caused to be moved upward and laterally away from the seat 2 until it reaches a transitory position, as shown in FIG. 4, approximately midway between its normal use position, as shown in FIG. 3, and its stowage position 12, as shown in FIG. 5. At this position, the longitudinal axis 31 is skewed to a horizontal plane and vertical planes extending laterally and longitudinally through the vehicle.

Further rotation will move the armrest 8 downwardly and toward the rear side of the backrest 6. Rotation stops when, as shown in FIG. 5, the armrest 8 is in contact with the backrest 6 at what is called the stowage position. In this position, the armrest 8 is located such that the longitudinal axis 31 thereof is now horizontal and adjacent the backrest 6 and positioned laterally across the vehicle 1. The orientation of the armrest 8 can further be seen by reference to the side panel 32 which is now the lower surface of the armrest 7 and lies in a horizontal plane, as shown in FIG. 5. Since the skewed pivot 11 is small enough so as not to protrude beyond the backrest wing 29 and the armrest 7 is cleared out of the aisle 4, movement by passengers through the aisle 4 is facilitated or at its maximum.

When in the stowage position 12, the armrest 8 engages the back rest 6 and is stopped from further downward rotation by the backrest 6. By using the backrest 6 as a stop, the present invention eliminates the need for a separate stop means. The backrest 6 is normally flat where the armrest 8 engages or rests against it, but it can include a localized depression into which the armrest 8 is nestled. Such a configuration would still stop the armrest 8, but would also provide a recess for the armrest 8 and make it less obtrusive to persons in a rear seat.

To move the armrest 8 from the stowage position, as shown in FIG. 5, back to the use position, as shown in FIG. 3, a lifting force is applied to simultaneously move the armrest 8 rearward and upward with respect to the back rest. Continued force is applied to rotate the armrest 8 until it moves past its midportion, as shown in FIG. 4. Thereafter, it moves downward and laterally toward the use position at the seat cushion 5, as shown in FIG. 3. The tip of the armrest 8 traces a path which is the reverse of path 19 when moved from its stowage position to its use position. In the illustrated embodiment, total rotation between the two positions is approximately 254 degrees. This number will, of course, vary for dissimilar seat designs.

In another embodiment, as shown in FIG. 6, the armrest 7 further comprises cylindrical depressions 35 that function as cupholders. When the armrest 7 is in the stowage position behind the seat backrest 6, the depressions 35 are vertically upward oriented such that when a can or cup is set into the depression 35, it is held fast. When the armrest 7 is moved back to the use position, the cylindrical depressions 35 are reoriented to a horizontal disposition opening toward the seat cushion 5 and hidden from view.

Although details of a preferred embodiment have been specified above, they are only intended to illustrate, and not limit, the present invention. Various other adaptations or modifications thereof are possible and will be readily identified by persons skilled in this or the related arts. Such changes, however, are intended to fully reside within the full spirit and scope of the claimed invention.

The embodiments of the invention in which an exclusive property or privilege is claimed are defined as follows:

1. A seat assembly for a vehicle comprising:
   a seat cushion unit;
   a seat backrest unit;
   an armrest unit having a longitudinal axis laterally disposed above and substantially parallel tot he seat cushion unit when in a first use position, and having a longitudinal axis generally horizontal and adjacent to the rear of the seat backrest unit when in a second stowage position;
   a single pivot means for cooperatively securing the armrest unit to the seat assembly, said pivot means being oriented such that the armrest unit, when rotated about the pivot axis, follows a predetermined arcuate path between the first use position and the second stowage position, said predetermined arcuate path defined by the movement of a point at an end of the armrest remote from the pivot axis, said path, when originating from the first use position, is initially simultaneously upward and laterally away from the seat cushion unit and ending in a downward direction and toward the rear of the seat backrest unit, said armrest and pivot means being located substantially within the rear profile of the seat backrest unit and substantially behind the front surface of the seat backrest unit in the stowed position; and
   first and second stop means such that the armrest unit is precluded from any pivotal rotation extending beyond the corresponding first use position and the second stowage position.

2. The seat assembly as defined in claim 1, wherein said armrest unit further comprises cupholder means such that when the armrest unit is in the first use position, said cupholder means are generally horizontally disposed toward the seat cushion unit, and when the armrest unit is in the second stowage position, said cupholder means are vertically disposed and available for use by persons seated rearward of said seat assembly.

3. A seat assembly for a vehicle comprising:
   a seat cushion unit;
   a seat backrest unit;
   an armrest unit comprising an elongate support structure, resilient cushion means, and aesthetic covering means, said armrest unit having a first use position wherein said support structure's longitudinal axis is laterally disposed above and substantially parallel to the seat cushion unit, and having a second stowage position, wherein said axis is generally horizontal and adjacent to the rear of the seat backrest unit;
   a single pivot means for cooperatively securing said armrest unit to the seat backrest unit, said pivot means having a pivot axis which is skewed to a horizontal plane and vertical planes extending laterally and longitudinally through the vehicle, thereby causing the armrest unit to rotate through a predetermined arcuate path between said first use and second stowage positions, said predetermined arcuate path defined by the movement of a point at an end of the armrest remote from the pivot axis, said path, when originating from the first use position, being initially simultaneously upward and laterally away from the seat cushion unit and ending in a downward direction and toward the rear of the seat backrest unit, said armrest and pivot means being located substantially within the rear profile of the seat backrest unit and substantially behind the front surface of the seat backrest unit in the stowed position; and
   stop means to prevent said arrest unit from rotating below the first use position.

4. The seat assembly as defined in claim 3, wherein said elongate structure has a bend adjacent to the pivot means.

5. The seat assembly as defined in claim 4, wherein said armrest unit moves through an arc of not less than 225 nor more than 270 degrees of rotation.

6. The seat assembly as defined in claim 5, further comprising a second stop means to prevent the armrest unit from rotating below the second stowage position, said stop means being the seat backrest unit.

* * * * *